Oct. 4, 1949.  R. T. SPENCE  2,483,443
FLOCKING METHOD AND APPARATUS
Filed Oct. 5, 1944  5 Sheets-Sheet 2

INVENTOR
ROBERT T. SPENCE.
BY Kenway & Witter
attorneys

Oct. 4, 1949. R. T. SPENCE 2,483,443
FLOCKING METHOD AND APPARATUS
Filed Oct. 5, 1944 5 Sheets—Sheet 3

INVENTOR
R. T. SPENCE

Oct. 4, 1949.  R. T. SPENCE  2,483,443
FLOCKING METHOD AND APPARATUS
Filed Oct. 5, 1944  5 Sheets-Sheet 4

INVENTOR
ROBERT T. SPENCE
BY Kenway & Witter
Attorneys

Oct. 4, 1949. R. T. SPENCE 2,483,443
FLOCKING METHOD AND APPARATUS
Filed Oct. 5, 1944 5 Sheets-Sheet 5

INVENTOR.
ROBERT T. SPENCE.
BY Kenway Witter
Attorney

Patented Oct. 4, 1949

2,483,443

UNITED STATES PATENT OFFICE 2,483,443

FLOCKING METHOD AND APPARATUS

Robert T. Spence, Lynn, Mass., assignor of eighteen one-hundredths to Louis J. O'Malley, Boston, Mass.

Application October 5, 1944, Serial No. 557,301

13 Claims. (Cl. 117—16)

This invention relates to novel method and apparatus for coating adhesively treated surfaces with a finely divided material and primarily to the art of flocking, i. e. the application of a coating of short fibres (cotton, silk, wool, rayon, etc. cut to uniform lengths) adhesively to any surface to form a pile-like covering thereover.

The vast range of practical flocking applications involve (1) innumerable objects of various characters as to their size, shape and material, (2) unlimited types of applications, regarding the specifications of desired flocked areas and designs, (3) kind, type, grade and length of flock to be used, (4) kind and specifications of the adhesives, (5) the purposes of the flocking applications. These varying conditions present intricate problems, each of which must be scientifically met to produce satisfactory results in each and every case, and I have discovered a very practical and thorough method of flocking, which includes features that function properly and efficiently to meet and master these intricate problems.

The procedure to be followed will vary somewhat with the nature of the product to be flocked, the kind and length of flock employed, the type of adhesive used, etc., but in any event I have discovered that the production of greatest efficiency and a very superior product demand that certain definite principles be followed in applying the flock. Briefly, these principles relate definitely and specifically to certain novel features which remove all guesswork and haphazard procedure from the process and result in a uniformly superior product regardless of its nature or that of the flocking materials employed.

I have discovered that the product being flocked, regardless of its nature, must be rigidly supported and enclosed within a chamber if the desired objects are to be efficiently accomplished. The surface being flocked should face upwardly and a perfectly controlled vertical vibration should be delivered to the chamber while flock under proper feeding control is fed and arranged perpendicularly from a point above to the surface. Proper feeding control of the flock is one of the most important elements of this invention and absolutely essential to its versatility. The vibrating speed and stroke are also important and will vary somewhat under varying conditions of product and flocking elements employed. The speeds and strokes employed will be those that are proven to be correct through definite practices and research on each particular job and hereinafter referred to as predetermined stroke and speed. The production of a new and improved process and machine embodying these principles applied to the flocking of any object regardless of its shape or character comprises a primary object of the invention.

The invention contemplates the rigid supporting of the object to be flocked within a closed chamber in a flocking unit and the vibrating of the unit through a predetermined stroke in a vertical path while feeding flock endwise to the upwardly facing surface to be flocked, the vibrations of the rigidly supported object being so uniformly rapid and positively forceful as to drive the perpendicular fibres deeply into the adhesive coating. I also preferably eliminate the influence of static charges on the flock by grounding the machine and more particularly the screen through which the flock is sifted. Provision is furthermore made for positively vibrating the flocked surface in inverted position whereby removing all excess flock therefrom before removing the flocked object from the chamber, all excess flock being retained within the chamber for future use.

A further feature of the invention relates to the continuous flocking of yard goods, toys and other objects of varying shapes, such flocking taking place within a closed and vibrated chamber during which the object being flocked is given a continuous movement continuously exposing different surfaces thereof to the downwardly directed shower of perpendicularly positioned flock, the continuous movement of the object together with the vibrations serving not only to flock all upwardly exposed surfaces thereof but also to remove excess flock as such surfaces are moved to an inverted position.

I have furthermore discovered that a smoother and more uniform vibration of the flocking units can be obtained by so counterbalancing one chamber against another for simultaneous movement in relatively opposite directions vertically while vibrating them simultaneously through equal strokes vertically and in relatively opposite directions. Such balanced construction together with novel means for producing the desired vibrating speed and stroke provides a superior flocking machine adapted to a wide variety of work and one which functions with a controlled vertical action delivered directly to the elements being processed within the flocking chambers.

This invention contemplates positive means, both method and apparatus, for accomplishing the highly desirable features of flocking in a greater variety of applications and on any material such as paper, cloth, leather, rubber, plastics, wood, metal, glass, etc. and to a far greater degree of quality and versatility than can be accomplished by other known and limited methods of flocking, such as blowing, spraying, beating, agitating with hex bars or other means such as electric vibrators, or by the electric static method.

The production of an improved method and apparatus embodying these novel features comprises a further object of the invention. These and other features of the invention will be best understood and appreciated from the following description of preferred embodiments thereof selected for purposes of illustration and shown in the accompanying drawings in which.

My invention contemplates primarily a method and apparatus whereby any object, regardless of its shape, size or material, can be uniformly and properly coated or flocked in any manner desired on all exposed surfaces or any part of such surfaces.

The invention embodies a combination of principles which function harmoniously in producing superior flocking applications on greatly diversified objects.

Four essential features that not only function to precision separately, but coordinate to make an efficient, economical, rapid and practical method of flocking are:

1. Proper holding of objects during the flocking process. I have discovered that, regardless of the nature of the object and regardless of the necessary action or movement of the object during the process, the object to be flocked must be held rigidly, within a closed chamber, so constructed that any adhesively treated surface can be faced upwardly to a controlled shower of flock, while the chamber is being vibrated through a predetermined speed and stroke in a vertical path.

2. Delivering controlled vibration to the object. I have also discovered that the many varying specifications of diversified flocking absolutely require accurate adjustments as to speed and stroke of vibration.

3. Proper supply of flock to the adhesively treated surfaces. I have furthermore discovered that properly presenting the flock to the adhesively treated surfaces while the object is being vibrated scientifically correct is of paramount importance.

4. Removing excess flock. Removing excess flock during the operation is essential to have the product come from the chamber in a finished condition. It is also desirable to retain excess flock within the chamber.

The rigid supporting of the object within a closed chamber and vibrating the unit, causes the flock to sift down through the screen and each little fibre immediately becomes perpendicular, due to the natural effect of following the least resistance in the vibrating atmosphere within the closed chamber. The vertically vibrating air within the chamber tends to arrange and maintain the fibres of flock to vertical position in which position they are driven endwise into the upwardly facing adhesive coating of the object. This action cannot be obtained in the open air and, therefore, this feature is of great importance in my invention.

Other features attending my flocking operations within closed chambers are: (1) govern the supply and placement of flock—just the right amount and right placing, (2) maintain healthy working conditions—loose flock in the air is very injurious to health, (3) eliminate waste—I can calculate and use just the amount of flock needed for each job, (4) promote clean work shops—and not have to salvage loose, dirty flock around the workroom for reuse.

A range of speeds and strokes of vibration to facilitate all flocking applications must be available. This feature is as important in successful flocking as a range of feeds and speeds are on machine tools or the adjustments on a sewing machine. Both machinists and stitchers know from experience that they have to make adjustments for different types of materials and for varying cuts or stitches. And the means of transmitting the predetermined speed and stroke of vibration directly to the object within the chamber are essential.

The type of screen, its mesh, width and length, height and location play an important part. I do not use a screen just to segregate the fibres, but in order to have perfect control of the shower of flock I use the proper screen for each application and regulate the adjustments regarding its location, width and length, and height so that just the right amount of the minute fibres will automatically adjust themselves perpendicularly in the vibrating atmosphere within the enclosed chamber and penetrate the adhesive according to specifications.

The flocking machine which I have herein specifically illustrated has been developed for the purpose of carrying out the novel features and operations hereinabove described and I desire it to be understood that the specific form of mechanism used is of secondary importance except in so far as it serves the required functions with precision, facility and economy. These functions include the flocking of various articles such as cards, yard goods, toys, etc. varying substantially in shape and character and requiring different treatments, and the machine herein illustrated and now to be described has been constructed to perform these operations with efficiency and precision.

Referring first to Figs. 1–7 of the drawings, 10 indicates a base on which the machine is supported. The flocking machine 12 per se is affixed directly and immovably to the base by bolts 14 and is adapted to be driven by driving mechanism 15 mounted on the base for adjustment along parallel slots 16 in the base. Bolts 18 pass through the slots and are provided with wing nuts 19 for tightening the mechanism 15 and the cooperating bottom plate 20 into holding contact with the base. The mechanism 15 comprises a motor 21 and a parallel countershaft 22 operatively connected by a belt 24 on pulleys 25 and 26. A stepped cone pulley 28 is affixed to the shaft 22 and is adapted to drive the flocking mechanism through a belt 29.

Figure 1:
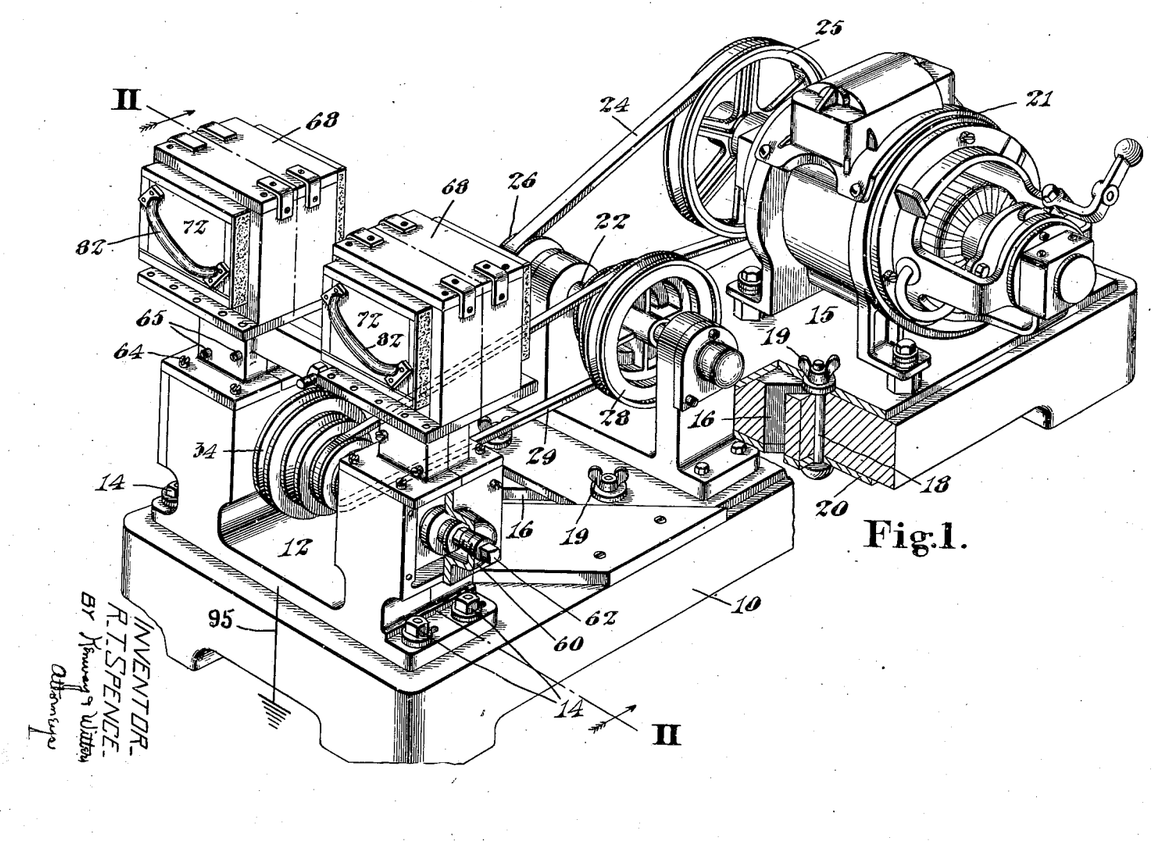
Fig. 1 is a perspective view of a machine embodying my invention.
Figures 2, 3:
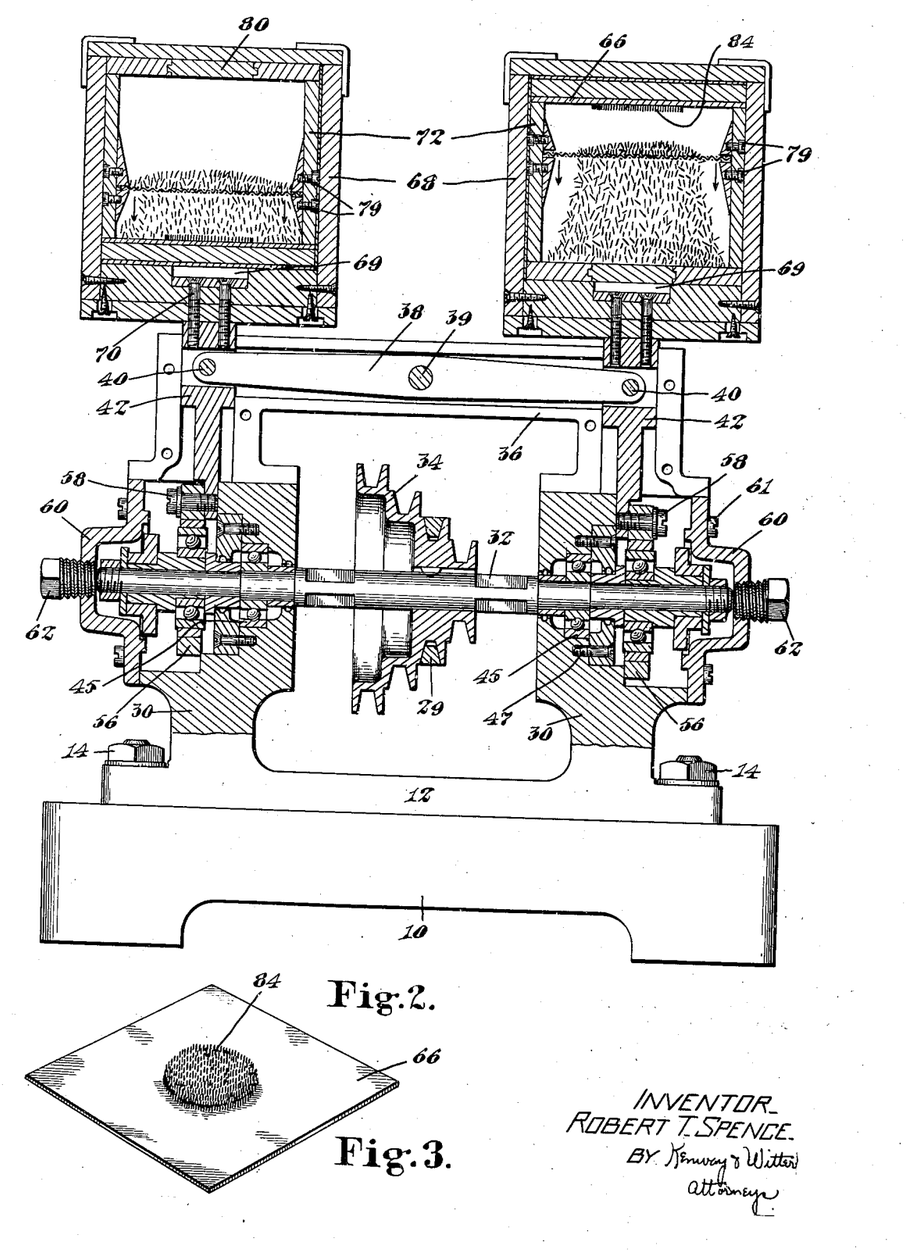
Fig. 2 is a vertical sectional view taken on line 2—2 of Fig. 1.
Fig. 3 illustrates a card which has been flocked by the machine.

The flocking mechanism 12 includes two integral uprights 30 within which is mounted a shaft 32, and a stepped cone pulley 34 for cooperating with the pulley 28 is affixed to the shaft 32 between the two uprights. The two uprights 30 are symmetrical as also are the two mechanisms operated thereby at the two ends of the shaft, the latter being adapted to vibrate or reciprocate two flocking chambers simultaneously as hereinafter described.

My invention contemplates precision flocking within a closed chamber through the action of vibrating the chamber through a predetermined stroke in a vertical path and at a predetermined speed, and in accordance with the preferred form of the invention I provide for counterbalancing two such chambers, one against the other, and for vibrating the chambers simultaneously through equal strokes vertically and in relatively opposite directions. Mounted on the uprights 30 is a bridge 36 within which is a lever 38 pivoted at an intermediate point 39. Each of the two outer ends of the lever is pivoted at 40 to a head 42 guided for vertical sliding movement in the bridge and having a horizontal top surface disposed somewhat above the bridge. The heads 42 are disposed directly above the two ends of the shaft 32 and are adapted to be reciprocated in opposite directions therefrom by mechanism now to be described.

Figures 4, 5:
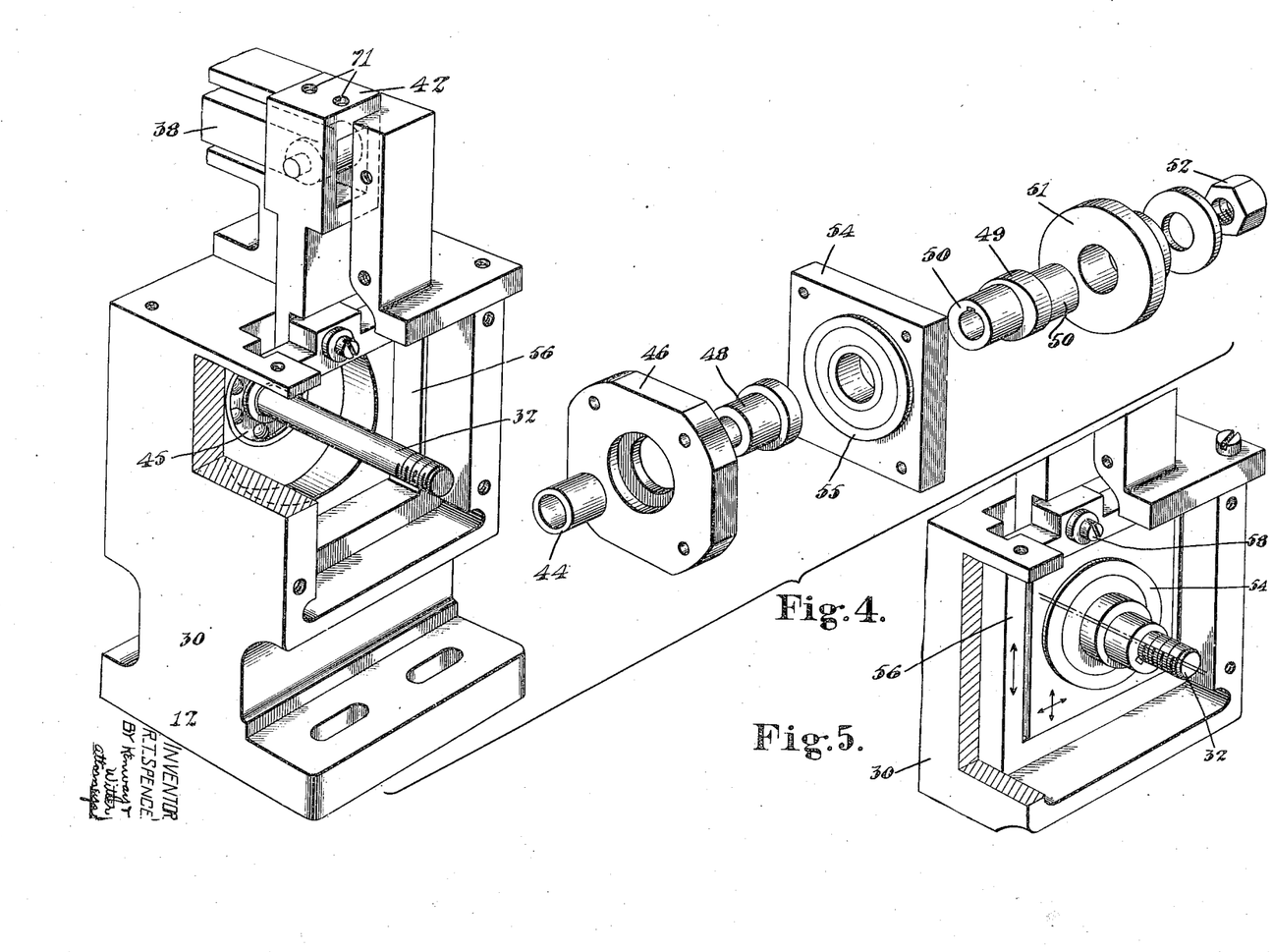
Fig. 4 is an exploded view of a portion of the machine.
Fig. 5 is a fragmentary perspective view of the exploded parts in assembled relation.

Each end of the shaft 32 extends through a bushing 44 in its upright 30 and is rotatably supported in its upright on a ball bearing 45 adjacent to the bushing, the ball bearing being held in place by a plate 46 secured by screws 47. A second bushing 48 is disposed on the shaft within the plate 46 and a third bushing 49 provided with an eccentric portion 50 on each end is mounted on the shaft adjacent to the bushing 48, the eccentrics being in opposed relation on opposite sides of the shaft 32 for counterbalancing purposes as illustrated in Fig. 2. A weight 51 on one eccentric 50 of each bushing 49 counterbalances the ball bearing 55 on the other eccentric 50 thereof, and all are secured by a nut 52 on the end of the shaft. Disposed on one of the eccentrics 50 and within a rectangular block 54 is a ball bearing 55. The block is fitted to and within a yoke 56 mounted for vertical sliding movement in the upright 30, the yoke being connected to the head 42 by a tap bolt 58. The block 54 is fitted to have a horizontal sliding movement within the yoke but no relative vertical movement (Fig. 5). Rotation of the shaft causes the two eccentrics 50, one on each end of shaft 32, to reciprocate their heads 42 vertically and the eccentrics are of equal throw and are so arranged that they reciprocate the two heads equally in opposite directions.

The chamber in each upright 30 is closed by a removable cover 60 secured by tap bolts 61 and two plugs 62 threaded into the cover are adapted to be removed for the application of a speedometer connection to the shaft if desired. The stroke imparted to the heads 42 can be changed by removing the bushings 49 and substituting other bushings having an eccentricity at 50 corresponding to the stroke desired. It will also be apparent that the vibrating speed imparted to the heads 42 can be varied by changing the position of the belt 29 on the stepped pulleys 28 and 34 and by shifting the driving mechanism 15 to different positions along the slots 16. The bridge 36 is secured to the uprights by tap bolts 64 and is conveniently made in two pieces secured together by tap bolts 65.

In Figs. 1, 2, 6 and 7 I have illustrated mechanism for flocking a flat surface such as the card 66 shown in Fig. 3. Mounted on the head 42 is an open rectangular frame 68. The bottom wall of the frame is recessed at 69 and the frame is secured to the head by bolts 70 extending through the wall at the recess and threaded into holes 71 in the head. A rectangular flocking box 72 constructed to fit within the frame is illustrated in detail in Figs. 6 and 7. The bottom wall 74 of the box is pivotally attached as by an adhesively secured canvas strip 75. A screen 76 of predetermined mesh is mounted horizontally in the box directly above the bottom wall by brackets 78 secured by screws 79. A sliding closure 80 is fitted to the top wall of the box and a handle 82 is attached to one end of the box.

Figures 6, 7:
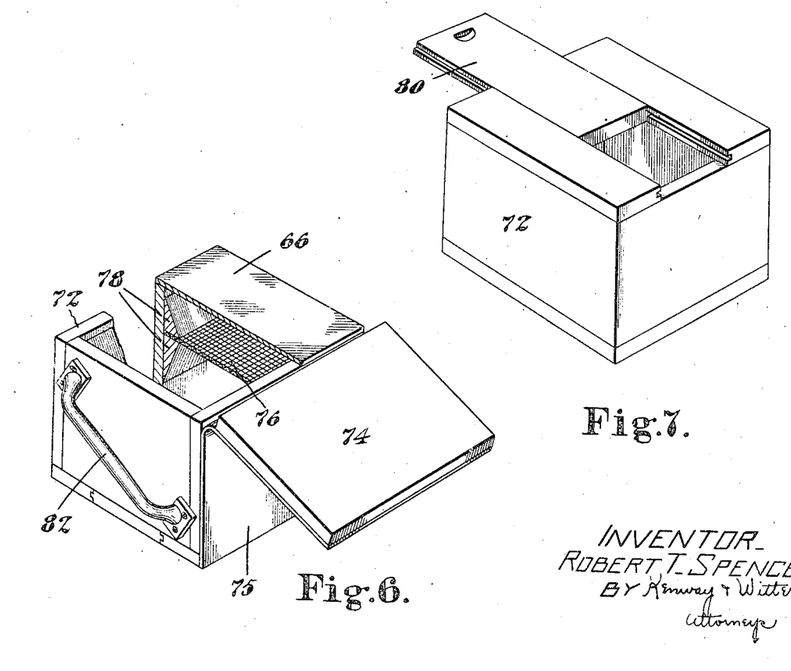
Fig. 6 is a bottom perspective view, partially broken away, of one of the flocking boxes shown in Fig. 1.
Fig. 7 is a top perspective view of the box.

A suitable amount of flock is placed in the box through the opening provided by the closure 80 shown in Fig. 7 and the box is inverted to the position of Fig. 6 when placing or removing a card 66. The card to be flocked is placed on the inverted box, as shown in Fig. 6, and the bottom wall 74 is then closed onto the card to hold it rigidly between the box and cover, it being understood that the surface of the card facing the screen has beeen coated with an adhesive over the area to be flocked. The box is then slid into the frame in the upright position shown at the left in Fig. 2, it being understood that a box 72 is placed in each of the two frames 68 for purposes of balance. The shaft 32 is then rotated from the motor whereupon the two boxes are reciprocated or vibrated vertically in opposite directions. This vibration causes the flock to sift through the screen and to become arranged in endwise direction as it passes through the vertically vibrating air on its way to the card, and the vibrations transmitted directly to the card are so intense as to drive the flock deeply and uniformly into the adhesive. The size of screen, its area, shape, height, mesh employed, the spacing of the screen from the surface to be flocked, the rate and stroke of vibration, etc. are factors that can be and are varied in accordance with the nature of the work to be performed and the character of material used. I desire however to emphasize the importance of controlling these factors and of securing uniform operation throughout to the end of producing uniform, superior and finished work.

It will be apparent that each box within its frame 68 is counterbalanced by the other box in its frame and that this novel arrangement not only provides for the uniform operation of both boxes but even more important provides a balanced mechanism requiring a minimum of power and operating with maximum smoothness and minimum undesirable machine vibration.

My invention contemplates not only the flocking of the adhesively treated surface but also the finishing of such surfaces by removing excess and loose flock therefrom. When the flocking step has been completed as illustrated at the left in Fig. 2 the box 72 is removed and replaced in the frame in inverted position as illustrated at the right in Fig. 2. Operation of the machine with the box in this inverted position removes the excess and loose flock from the card and leaves a uniformly finished and secure flocking 84. The excess flock passes downwardly through the screen to the top chamber and in position for the next flocking operation.

Figure 8:
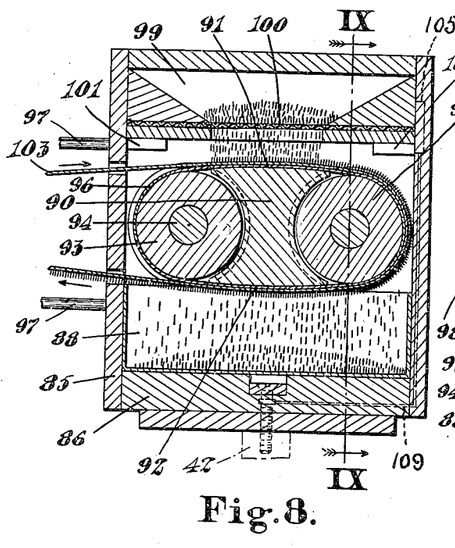
Fig. 8 is a sectional view, on line 8—8 of Fig. 9, through a flocking box adapted to flock yard goods.
Figure 9:
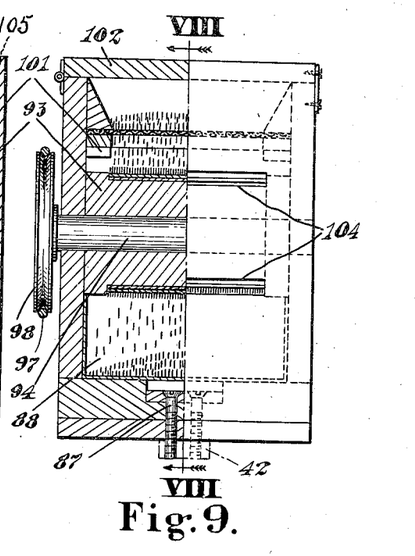
Fig. 9 is an elevation thereof partly in section on line 9—9 of Fig. 8.

In Figs. 8 and 9 I have illustrated a flocking box 85 adapted to be mounted on the machine shown in Figs. 1 and 2 and employed for the continuous flocking of yard goods. This box has a recessed bottom wall 86 provided with screws 87 for securing the box to the head 42, and disposed over the bottom wall is a flock receiving pan 88. Disposed intermediately within the box and above the pan is an I-shaped block 90 having top and bottom surfaces 91 and 92, and two rolls 93 are mounted on shafts 94 at opposite sides of the block. A wide and endless band 96 extends around the rolls and over the surfaces 91 and 92. The rolls and band are adapted to be driven by a belt 97 on a pulley 98 fixed to one of the shafts exteriorly of the box. The top portion of the box is provided with a removable hopper 99 resting on cleats 101 and having side walls sloping downwardly to a screen 100 disposed over the surface 91. The hopper is closed by a pivoted cover 102. The box is adapted to receive and flock yard goods 103 passed into and from the box through two openings 104 in a side wall.

The boxes 85 are adapted to be mounted on the machine in lieu of the frames 68 shown in Figs. 1 and 2. Yard goods to be flocked, as the ribbon 103, is held under tension looped about the band 96 and extends outwardly through the openings 104. A supply of flock is placed in the hopped 99 and during the operation of the machine the pulley 98 is driven in a direction moving the ribbon through the box as indicated by the arrows in Fig. 8. The top surface of the ribbon is coated with an adhesive in any convenient manner and as it passes over the surface 91 beneath the screen 100 the flock is sifted and perpendicularly positioned endwise thereonto and driven deeply into the adhesive. The flocked surface continues about the outer roller 93 and as it passes back in inverted position over the downwardly facing surface 92 the loose and excess flock is automatically removed therefrom. When the ribbon passes outwardly of the box it is in finished condition and all excess flock remains in the box for future use. It is particularly pointed out that the surfaces 91 and 92 provide firm and rigid supports for the ribbon that positively impart the vibration of the machine thereto and effect deep seating of the flock into the adhesive and the removal of all loose flock therefrom.

Successful and superior flocking requires that the flock shall be projected endwise to and into the surface being flocked and such disposition of the flock to the maximum degree comprises a primary object of my invention. This object is substantially facilitated by performing the flocking within a closed chamber having a screen which is vibrated as a unit with the chamber to sift the flock downwardly and arrange it in endwise direction to the surface being flocked as heretofore specifically described. This surface is located beneath and in close proximity to the screen and, since the atmosphere therebetween is enclosed within and vibrates with the chamber, there is no outside influence or tendency to disarrange the endwise position of the flock as it passes to said surface. It will also be apparent that such endwise disposition of the flock results in a relatively deeper penetration thereof into the adhesive.

It is well known that flock is subject to influence by static electric charges and attempts have been made to employ static electricity to control the movement and disposition of flock in flocking operations. I have discovered however that flocking operations can best be performed in the absence of static electricity and I prefer to ground my flocking machine, as indicated at 95 in Fig. 1, and furthermore to ground the screen through which the flock is sifted, as indicated in Fig. 8. A metal plate 105 is disposed in the box 85 to contact the screen 100 and the plate is grounded to the screw 87 by a wire 109. Thus it will be seen that static charges are continuously dissipated from the screen, thereby preventing any static influence on the flock as it passes through and downwardly from the screen.

Figure 10:
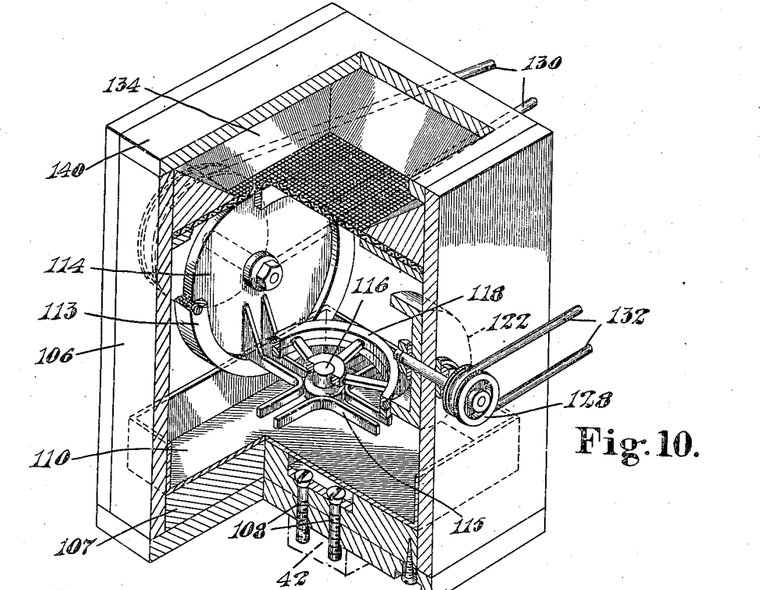
Fig. 10 is a perspective view, partly broken away, of another flocking box adapted to flock toys and other solid objects.
Figure 11:
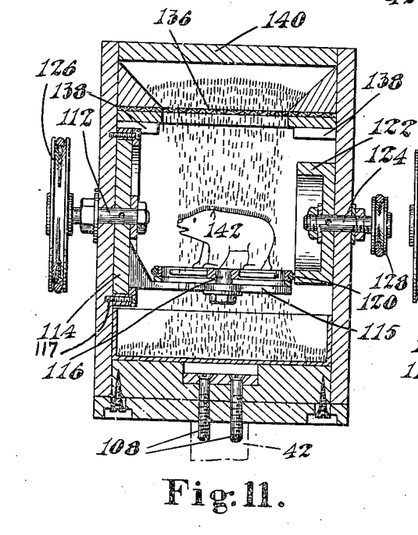
Fig. 11 is a vertical sectional view through the same and Fig. 12 is a like view showing the parts in a different position.
Figure 12:
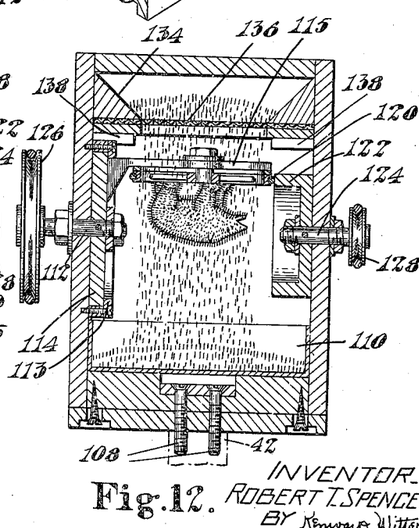

The invention is also applicable to the flocking of toys and other solid objects of regular or irregular shape and in Figs. 10–12 I have illustrated a flocking box 106 particularly adapted thereto. This box includes a recessed bottom wall 107 provided with screws 108 for securing the box to a head 42 of the machine in lieu of the frame 68. A flock receiving pan 110 is disposed over the bottom wall. A shaft 112 mounted for rotation in one side wall of the box carries a disc-like element 114 on its inner end and from the margin of which projects inwardly of the box an open grill 115 having a centrally disposed hub 116. The element 114 is supported for rotation within an annular guide 113 secured to the adjacent side wall of the box by screws 117. An open wheel-like support 118 for the object to be flocked is rotatably carried on the hub and is provided on its periphery with a band 120 of rubber or the like for driving engagement by a wheel 122 mounted on the inner end of a second shaft 124. The two shafts 112 and 124 are co-axial, are mounted in oppositely disposed side walls of the box and are adapted to be driven by pulleys 126 and 128 on their outer ends and engaged by belts 130 and 132. The top portion of the box is provided with a hopper 134 having side walls sloping downwardly to a screen 136 disposed over the space between the two shafts. The hopper and screen rest on cleats 138 and can be removed to provide access to the interior of the box. A cover 140, like the cover 102, is pivoted to the box to provide a closure for the hopper.

Two boxes 106 are adapted to be mounted in upright position on the two heads 42 and can be loaded by opening the cover and removing the hopper and screen, or the box can be made otherwise accessible for loading purposes. The object to be flocked, as the toy 142, is affixed in upright position to the support 118 centrally of the hub 116, as by adhesive or otherwise, the object having been suitably coated with an adhesive as will be understood. The screen is replaced, a supply of flock is provided in the hopper and the cover is closed. Simultaneously with the operation of the machine and the vertical vibration of boxes the shafts 112 and 124 are rotated at speeds which impart universal movement to the object 142. Rotation of the shaft 112 exposes all sides of the object to the screen and rotation of the shaft 124 causes the support 118 to be rotated on the hub 116 and the ends of the object to be likewise exposed. The shaft 124 is ordinarily rotated relatively faster although the relative rotation imparted to the shafts will be such as appears best to expose and flock the object. In any event, it will be apparent that the object always remains beneath and exposed to the screen, that the open character of the supports 115 and 118 permit free passage of flock therethrough when these supports are uppermost, and that the universal movement of the object causes its surface to be passed continuously to the screen and from thence to inverted position wherein the loose and excess flock are automatically removed. The object is thereby flocked uniformly thereover and the operation is completed and finished automatically without manual effort.

It will now be apparent that I have produced a new and superior method and machine for performing flocking operations on material and objects of varying character and that the invention is adaptable and applicable to all types of flocking regardless of the shape or character of the work. The work ordinarily includes cards or strips of sheet material and solid objects and, while I have herein for the purpose of simplicity illustrated the machine as operating on a single work piece within a chamber, it will be understood that in commercial practice this feature can be multiplied as may seem desirable. It is furthermore pointed out that my invention is based on new and superior flocking principles including flocking within a closed chamber vibrated vertically under absolute control, the rigid supporting and positive vibrating of the surface being flocked and resulting in deeply flocked and superior work, the inverting of the flocked surface resulting in the removal of loose and excess flock and the automatic production of a finished product, the retaining of all unused flock within the chamber, the perfect and automatic flocking of irregular objects by giving universal movement thereto resulting in exposing all surfaces thereof to the perpendicularly positioned shower of flock, the provision of relatively counterbalanced flocking chambers resulting in a smooth and efficient vibrating mechanism, a single machine adapted to perform all types of flocking, and finally a controlled and fully automatic flocking operation in which the manual, haphazard and uncontrolled methods heretofore employed are entirely eliminated.

Having thus described my invention what I claim as new and desire to secure by Letters Patent of the United States is,

1. A flocking machine comprising a frame, two supports mounted in spaced relation and for vertical movement on the frame, two flocking boxes respectively on the supports and each having a flocking chamber and a screen of predetermined mesh disposed horizontally through the chamber, means counterbalancing the two boxes one against the other for simultaneous movement in relatively opposite directions vertically, and means for vibrating the boxes simultaneously through equal strokes vertically and in relative opposite directions.

2. The machine defined in claim 1 in which the counterbalancing means comprises a lever pivotally movable on the frame about an intermediate axis and connected to the boxes at opposite sides of said axis.

3. A flocking machine comprising a frame, two vertically movable blocks in spaced relation on the frame, a lever pivoted to the frame intermediately of and connected to the blocks at opposite sides of the pivot axis, the blocks being adapted to receive and support flocking boxes thereon, a shaft in the frame beneath the blocks, and means including eccentrics on the shaft beneath the blocks for vibrating the blocks vertically and in opposite directions when the shaft is rotated.

4. A method of coating the adhesive surface of an object with a finely divided material, which consists in rigidly supporting the object within a chambered space excluded from the outside atmosphere and with at least a portion of said surface facing upwardly, projecting from a position spaced above the object a predetermined quantity of said material downwardly and in uniform distribution onto the upwardly facing portion of said surface, simultaneously therewith rapidly vibrating the object together with the air in said space through a predetermined stroke and speed in a vertical path, inverting the object after the finely divided material has been projected onto and driven into its upwardly facing portion, and continuing the vibrating action to remove loose and excess material from the coated and inverted surface.

5. A method of coating the adhesive surface of an object with a finely divided material, which consists in rigidly supporting the object within a chambered space excluded from the outside atmosphere and with at least a portion of said surface facing upwardly, projecting from a position spaced above the object a predetermined quantity of said material downwardly and in uniform distribution onto the upwardly facing portion of said surface, simultaneously therewith rapidly vibrating the object together with the air in said space through a predetermined stroke and speed in a vertical path, and simultaneously rotating the object about a plurality of relatively angular axes, thereby facing different portions of said surface upwardly and removing loose and excess material from the coated portions as they pass to inverted position.

6. A method of flocking which consists in rigidly supporting an object to be flocked within a chambered space excluded from the outside atmosphere and with at least a portion of the object facing upwardly, projecting from a position spaced above the object a predetermined quantity of flock downwardly and in uniform distribution onto the upwardly facing portion of said surface, simultaneously therewith rapidly vibrating the object together with the air in said space through a predetermined stroke and speed in a vertical path whereby to arrange the flock endwise to and drive it into a coating of adhesive on the object, and simultaneously therewith moving the object to dispose different surfaces thereof upwardly and thereafter downwardly during the vibrating operation.

7. The method defined in claim 6 plus the step of moving the object continuously in one direction transversely of the downward path of the flock during the vibrating operation, thereby flocking different portions of the object as they pass through the flocking field.

8. The method defined in claim 7 plus the step of continuously reversing and continuing the movement of the flocked portion of the object in the opposite direction in said space to a position facing downwardly beneath the flocking position, thereby removing the excess flock from the flocked object as it moves in the said opposite direction.

9. The method defined in claim 6 plus the step of rotating the object about two relatively right angular axes during the vibrating operation, thereby exposing all surfaces thereof to the downwardly directed flock and removing the excess flock as the flocked surfaces become inverted.

10. A flocking machine comprising a box provided with a chamber therein, means providing a flock containing hopper at the top portion of the chamber, a horizontal screen of predetermined mesh disposed in the chamber between the hopper and a portion of the chamber therebeneath, means in the chamber beneath the screen and having a horizontal surface facing upwardly toward the screen for supporting a sheet to be flocked, means in the chamber for receiving said sheet from the surface and supporting a loop thereof, the sheet being adapted to pass in one direction over said surface and in a lower reach in the reverse direction therebeneath, said lower reach being spaced from the bottom of the chamber and the box having openings therethrough for passage of the sheet into and from the chamber, and power operated means for vibrating the box vertically and uniformly through a predetermined stroke and speed.

11. The machine defined in claim 10 in which said sheet receiving and loop supporting means is rotatably mounted, and means exteriorly of the box for rotating said rotatably mounted means to feed the sheet.

12. A flocking machine comprising a box provided with a chamber therein, means providing a flock containing hopper at the top portion of the chamber, a horizontal screen of predetermined mesh disposed in the chamber between the hopper and a portion of the chamber therebeneath, power operated means for vibrating the box vertically and uniformly through a predetermined stroke and speed, and means within the chamber for supporting and maintaining an object to be flocked in position beneath the screen and including means for rotating the object at predetermined relative speeds about two relatively angular axes.

13. The machine defined in claim 12 in which the last named means is constructed to rotate the object about a horizontal axis and simultaneously therewith about an axis in a plane passing through the screen, and in which the object supporting means is of open construction permitting flock to pass therethrough to the object when such means is disposed between the screen and object.

ROBERT T. SPENCE.

REFERENCES CITED

The following references are of record in the file of this patent:

UNITED STATES PATENTS

| Number | Name | Date |
|---|---|---|
| 239,286 | Whitnum | Mar. 22, 1881 |
| 358,647 | Campbell | Mar. 1, 1887 |
| 1,955,552 | Kruger | Apr. 17, 1934 |
| 1,991,001 | Reynolds et al. | Feb. 12, 1935 |
| 2,173,032 | Wintermute | Sept. 12, 1939 |
| 2,187,617 | Fogg | Jan. 16, 1940 |
| 2,340,850 | Wolfson et al. | Feb. 8, 1944 |